(12) United States Patent
Yang (10) Patent No.: US 10,126,778 B2
(45) Date of Patent: Nov. 13, 2018

(54) FLEXIBLE DISPLAY DEVICE

(71) Applicant: SHENZHEN ROYOLE TECHNOLOGIES CO. LTD., Shenzhen (CN)

(72) Inventor: Songling Yang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/539,435

(22) PCT Filed: Dec. 25, 2014

(86) PCT No.: PCT/CN2014/095020
§ 371 (c)(1),
(2) Date: Jun. 23, 2017

(87) PCT Pub. No.: WO2016/101228
PCT Pub. Date: Jun. 30, 2016

(65) Prior Publication Data
US 2017/0357287 A1    Dec. 14, 2017

(51) Int. Cl.
*H05K 1/14*    (2006.01)
*G06F 1/16*    (2006.01)
(Continued)

(52) U.S. Cl.
CPC ...... *G06F 1/1616* (2013.01); *G02F 1/133305* (2013.01); *G06F 1/1652* (2013.01); *G06F 1/1677* (2013.01); *G09F 9/00* (2013.01)

(58) Field of Classification Search
CPC .... G06F 1/1616; G06F 1/1652; G06F 1/1677; G02F 1/133305
(Continued)

(56) References Cited

U.S. PATENT DOCUMENTS 6,762,929 B2 *  7/2004  Sawyer ................ G06F 1/1601
                                                                248/535
8,174,628 B2 *  5/2012  Matsushita ....... G02F 1/133305
                                                                348/836
(Continued)

OTHER PUBLICATIONS

The extended European search report dated Jun. 13, 2018 from corresponding application No. EP 149087961.
(Continued)

*Primary Examiner* — Hung S Bui
(74) *Attorney, Agent, or Firm* — Hauptman Ham, LLP (57) ABSTRACT

A flexible display device includes a casing, a circuit board, a first reel, a flexible display, and a connecting line. The circuit board is received in the casing. The first reel is rotatably arranged in the casing. The flexible display is at least partially received in the casing, and the flexible display can be wound around the first reel. The circuit board and the flexible display are connected via the connecting line. The connecting line can be wound around the first reel. A junction is formed in a position where the connecting line and the flexible display are connected. When the flexible display is fully unfolded outside the casing, the connecting line is at least partially wound around the first reel from the junction. When the flexible display is folded in the casing, both the flexible display and the connecting line are wound around the first reel.

18 Claims, 4 Drawing Sheets

(51) Int. Cl.
*G09F 9/00* (2006.01)
*G02F 1/1333* (2006.01)

(58) Field of Classification Search
USPC .......................................... 361/741
See application file for complete search history.

(56) References Cited

U.S. PATENT DOCUMENTS

| | | | |
|---|---|---|---|
| 2002/0070910 A1* | 6/2002 | Fujieda | G06F 1/1615 |
| | | | 345/85 |
| 2003/0071800 A1* | 4/2003 | Vincent | G02F 1/15 |
| | | | 345/204 |
| 2008/0247126 A1 | 10/2008 | Otsuka et al. | |
| 2013/0058063 A1* | 3/2013 | O'Brien | G06F 1/1624 |
| | | | 361/807 |
| 2013/0127799 A1* | 5/2013 | Lee | G06F 1/1652 |
| | | | 345/204 |
| 2017/0031387 A1* | 2/2017 | Kim | G06F 1/1652 |

OTHER PUBLICATIONS

Office Action dated Apr. 18, 2018 from corresponding application No. KR 10-2017-7019027.

* cited by examiner

FLEXIBLE DISPLAY DEVICE

TECHNICAL FIELD

The present disclosure relates to the field of electronic technology, and particularly to a flexible display device.

BACKGROUND

For existing flexible display devices, when winding and folding a flexible display, a connecting line of the flexible display device is rotated with a reel, which may cause the connecting line to be easily broken.

SUMMARY

The present disclosure aims to solve at least one of technical problems of the existing technology. Therefore, the present disclosure needs to provide a flexible display device.

A flexible display device in accordance with a preferable embodiment of the present disclosure may include a casing, a circuit board, a first reel, a flexible display, and a connecting line. The circuit board is received in the casing. The first reel is rotatably arranged in the casing. The flexible display is at least partially received in the casing, and the flexible display can be wound around the first reel. The circuit board and the flexible display are connected via the connecting line. The connecting line can be wound around the first reel. A junction is formed in a position where the connecting line and the flexible display are connected. When the flexible display is fully unfolded outside the casing, the connecting line is at least partially wound around the first reel from the junction. When the flexible display is folded in the casing, both the flexible display and the connecting line are wound around the first reel.

For the flexible display device provided by the preferable embodiment of the present disclosure, the connecting line is always partially wound around the first reel from the junction, the force applied to the junction is dispersed, so that the connecting line is not easily broken. Furthermore, the connecting line has good connectivity during a process that the flexible display is extended out or is folded, thereby improving the reliability of the flexible display device.

In some embodiments, the junction is fixed on the first reel.

In some embodiments, the flexible display device may include a second reel to wind the connecting line. The second reel is arranged in the casing.

In some embodiments, the flexible display device may further include an elastic element arranged in the casing. An end of the elastic element is connected to the second reel, and another end of the elastic element is fixed to the casing.

In some embodiments, the elastic element is a spring.

In some embodiments, the connecting line is a flexible printed circuit (FPC).

In some embodiments, the length of the connecting line wound around the first reel is larger than $\pi r$, where r is the radius of the first reel.

In some embodiments, a detection device may be arranged on the elastic element to detect the deformation of the elastic element. Alternatively, a detection device may be arranged on the first reel to detect the rotation of the first reel. The extending length of the flexible display is determined based on the deformation or the rotation.

In some embodiments, when the flexible display is in an unfolded state, the flexible display is extended out in the first direction away from the casing, the second reel moves in the second direction opposite to the first direction under the pull force of the elastic element, and the connecting line bypasses the second reel and stays in the tight state. When the flexible display is in a folded state, the flexible display moves in the second direction under the winding of the first reel, and the connecting line is wound around the first reel.

In some embodiments, at least a part of the flexible display is arranged outside the casing.

Additional aspects and advantages of the present disclosure will be partially illustrated in the following descriptions, some parts will become apparent, or may be known by implementation of the present disclosure.

BRIEF DESCRIPTION OF THE DRAWINGS

The above and/or additional aspects and advantages of the present disclosure will become apparent and will be easily understood in descriptions of embodiments in combination with the accompanying drawings.

DETAILED DESCRIPTION OF ILLUSTRATED EMBODIMENTS

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are just used to illustrate the present disclosure, and shall not be construed to limit the present disclosure.

In the description of the present disclosure, it is to be understood that orientations or position relationships illustrated by terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" are based on orientation or position relationship based on the accompanying drawings, and are not used to indicate or imply the devices or elements must have specific orientations, and must be constructed and operated in specific orientations, and shall not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" or "a number of" means two or more than two, unless specified otherwise.

In the present disclosure, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications of two elements or mutual interaction relationship between two elements. Those skilled in the art can understand specific meaning of the above terms in the present disclosure according to specific situations.

In the present disclosure, unless specified and limited otherwise, a first feature "on" or "below" a second feature may include that the first feature is in direct contact with the second feature, and may also include that the first feature and the second feature are not in direct contact with each other, but are contacted via an additional feature formed therebetween. Furthermore, the first feature "on," "above," or "on top of" a second feature may include that the first feature is right or obliquely "on," "above," or "on top of" the second feature, or just means that the first feature is at a height higher than that of the second feature. The first feature "below," "under," or "on bottom of" the second feature may include that the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, elements and settings of specific examples will be described. Certainly, these elements and settings are only examples and are not intended to limit the present disclosure. In addition, reference numerals may be repeated in different examples of the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

The following will further illustrate embodiments of the present disclosure in detail in combination with the accompanying drawings.

Figure 1:
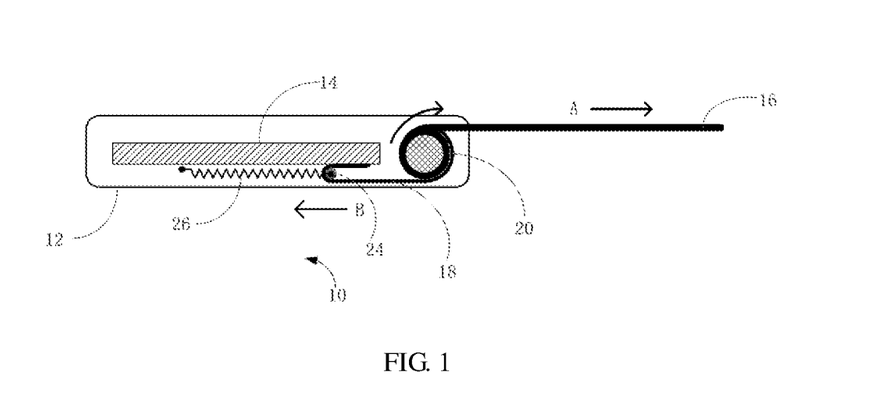
FIG. 1 is a plan schematic view of a flexible display device in accordance with an embodiment of the present disclosure.
Figure 2:
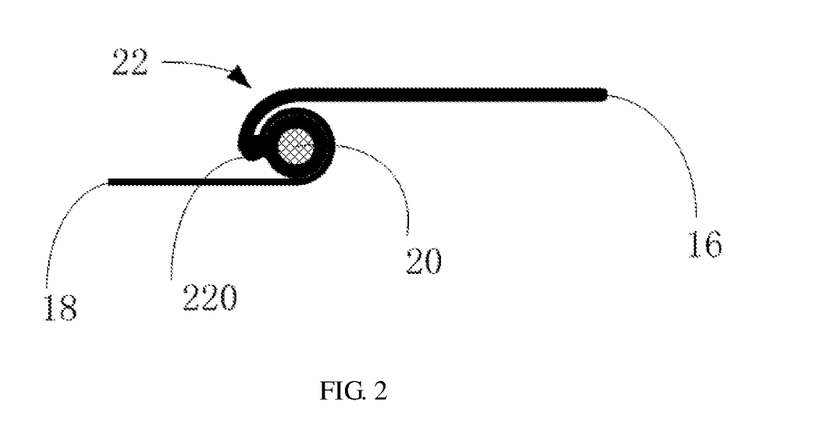
FIG. 2 is a structural schematic view showing a flexible display and a connecting line of a flexible display device in a fully unfolded state in accordance with an embodiment of the present disclosure.
Figure 3:
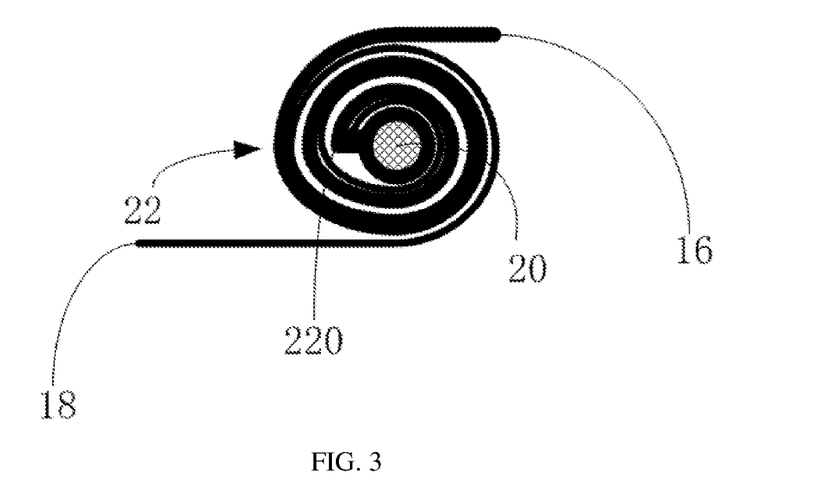
FIG. 3 is a structural schematic view showing a flexible display and a connecting line of a flexible display device in a fully folded state in accordance with an embodiment of the present disclosure.

Referring to FIGS. 1-3, a flexible display device 10 of a preferable embodiment of the present disclosure includes a casing 12, a circuit board 14, a first reel 20, a flexible display 16, and a connecting line 18. The circuit board 14 is received in the casing 12. The first reel 20 is rotatably arranged in the casing 12. The flexible display 16 is at least partially received in the casing 12, and the flexible display 16 can be wound around the first reel 20. The circuit board 14 and the flexible display 16 are connected via the connecting line 18. The connecting line 18 can be wound around the first reel 20.

A junction 220 is formed in a position where the connecting line 18 and the flexible display 16 are connected. When the flexible display 16 is fully unfolded outside the casing 12, the connecting line 18 is at least partially wound around the first reel 20 from the junction 220. When the flexible display 16 is folded in the casing 12, both the flexible display 16 and the connecting line 18 are wound around the first reel 20.

For the flexible display device provided by the preferable embodiment of the present disclosure, the connecting line 18 is always partially wound around the first reel 20 from the junction 220, the force applied to the junction 220 is dispersed, so that the connecting line 18 is not easily broken. Furthermore, the connecting line 18 has good connectivity during a process that the flexible display 16 is extended out or is folded, thereby improving the reliability of the flexible display device 10.

In the embodiment, the first reel 20 is configured to wind the flexible display 16 and the connecting line 18, and the first reel 20 is arranged in the casing 12. The connecting line 18 and the flexible display 16 are folded from the junction 220. The junction 220 is arc shape and fixed on the first reel 20. The connecting line 18 is connected to an end of the flexible display 16, and another end of the flexible display 16 can be extended out of the casing 12. At the junction 220 between the connecting line 18 and the flexible display 16, the connecting line 18 and the flexible display 16 are folded. The connecting line 18 and the flexible display 16 are at least partially folded to form an overlapping segment 22. The overlapping segment 22 is wound around the first reel 20 to form a radian, and the radian is greater than or equal to $\pi/2$ rad. The force applied to the junction 220 between the connecting line 18 and the flexible display 16 is dispersed due to the overlapping segment 22.

Therefore, a slip of the first reel 20 will not occur when the connecting line 18 and the flexible display 16 are wound around the first reel 20, so that the connecting line 18 and the flexible display 16 can be wound around the first reel 20 better, and the connecting line 18 is not easily broken due to the arc shaped junction 220.

In the embodiment, the flexible display device 10 includes a second reel 24 configured to wind the connecting line 18. The second reel 24 is arranged in the casing 12.

Therefore, the connecting line 18 can be wound around the second reel 24 without sway or bending in the casing 12. The connecting line 18 is arranged in the casing 12 reasonably and efficiently, so that the damage to the connecting line 18 can be reduced, and the service life of the connecting line 18 can be prolonged.

Specifically, when the connecting line 18 is too long, two or more than two rotation reels can be arranged in the casing 12 to wind the connecting line 18, thus the connecting line 18 can be always in a tight state.

In the embodiment, the flexible display device 10 also includes an elastic element 26 arranged in the casing 12. An end of the elastic element 26 is connected to the second reel 24, and another end of the elastic element 26 is fixed to the casing 12, or flexibly fixed in the casing 12 according to device characteristic. Under the pull force of the elastic element 26, the fixed position can cause the connecting line 18 to be unfolded with respect to the flexible display 16, and be wound and folded with respect to the flexible display 16. The connecting line 18 extends from the first reel 20 and bypasses the second reel 24, and a distal end of the connecting line 18 is secured to the circuit board 14. When the flexible display 16 is extended out of the casing 12 and is unfolded, the connecting line 18 wound around the first reel 20 is also unfolded. A strength length of the elastic element 26 reduces, and the elastic element 26 drives the second reel 24 to roll in the horizontal direction to strain the connecting line 18, so that the distance between the second reel 24 and the first reel 20 increases. When the flexible display 16 is folded in the casing 12, the flexible display 16 and the connecting line 18 are wound around the first reel 20, the strength length of the elastic element 26 increases, so that the distance between the second reel 24 and the first reel 20 reduces.

Therefore, the elastic element 26 is connected to the second reel 24, thus the connecting line 18 bypassing the second reel 24 and secured to the circuit board 14 can always stay in the tight state, without sway or bending in the casing 12. The connecting line 18 is arranged in the casing 12 reasonably and effectively, so that the damage to the connecting line 18 can be reduced, and the service life of the connecting line 18 can be prolonged. When the connecting line 18 wound around the first reel 20 is dispersed, the dispersed connecting line 18 is wound and strained by the elastic element 26 and the second reel 24, avoiding that the first reel 20 is stuck by the dispersed connecting line 18. In the embodiment, the elastic element 26 is a spring.

Therefore, it is easy to mount the spring, the cost is low, and it is easy to replace the spring.

Specifically, the second reel 24 is equivalent to a movable pulley, and is connected to the elastic element 26. An end of the connecting line 18 bypasses the second reel 24 and is secured to the circuit board 14, and another end of the connecting line 18 is connected to the flexible display 16. When the flexible display 16 is extended out of the casing 12, the second reel 24 can move in a second direction B under the pull of the spring. When the flexible display 16 is unfolded in the casing 12, both the connecting line 18 and the flexible display 16 are wound around the first reel 20, and the second reel 24 is driven by the connecting line 18 to move in a first direction A, and meanwhile, the spring is extended. As an embodiment, the following will be illustrated in combination with FIG. 1. A torsion spring (not shown in the drawings) can be arranged on the first reel 20, and the resilience of the torsion spring drives the first reel 20 to rotate. The resilience is larger than the force of the elastic element 26. For instance, when an external force in the first direction A is applied to pull the flexible display 16, the first reel 20 rotates clockwise to twist the torsion spring, so that the resilience in the second direction B opposite to the first direction A is generated. That is, the external force in the first direction A is balanced with the resilience and the pull force of the elastic element 26 (in the second direction B). Under the balance state, when the external force in the first direction A is reduced, the resilience of the torsion spring and the pull force of the elastic element 26 are accordingly balanced with the external force in the first direction A, so that the first reel 20 is driven to rotate counterclockwise to cause both the flexible display 16 and the connecting line 18 to be wound around the first reel 20 until force balance reaches. When the external force in the first direction A is removed, the resilience of the torsion spring and the pull force of the elastic element 26 drives the first reel 20 to rotate counterclockwise until the flexible screen is in a fully folded state (the state includes a state of partially extending out of the casing 12). As the resilience of the torsion spring is larger than the force of the elastic element 26, in the fully folded state, the resilience forms a force opposite to the pull force of the elastic element 26 in the second direction B to reach a balance state, so that the connecting line 18 is caused to stay in the tight state. The torsion spring is known by those skilled in the art and will not be repeated herein. The above just explains and illustrates the principle, and is not to limit the present disclosure. Based on the principle, changes made by those skilled in the art still fall in the scope of the present disclosure.

Preferably, a limit mechanism can also be arranged on the first reel 20, for example, a block element is used to fix the first reel 20 to cause the first reel 20 to be not able to rotate, and so on. Therefore, the first reel 20 can be fixed at any state of extending the flexible display 16 out of the casing 12.

In the embodiment, the connecting line 18 is a flexible printed circuit (FPC).

Therefore, the connecting line 18 has good flexibility and can be wound for many times.

In the embodiment, the length of the connecting line 18 wound around the first reel 20 is greater than $\pi r$, where r is the radius of the first reel 20. The flexible display 16 is always partially wound around the first reel 20 from the junction 220.

Therefore, the force applied to the junction 220 between the connecting line 18 and the flexible display 16 is dispersed, the connecting line 18 is not easy to be broken at the junction 220, and the flexible display 16 is also not easy to be broken at the junction 220.

Certainly, the above values are just given as examples to help to explain how the overlapping segment 22 makes the connecting line 18 not easy to be broken, and are not to limit the present disclosure.

Figure 7:
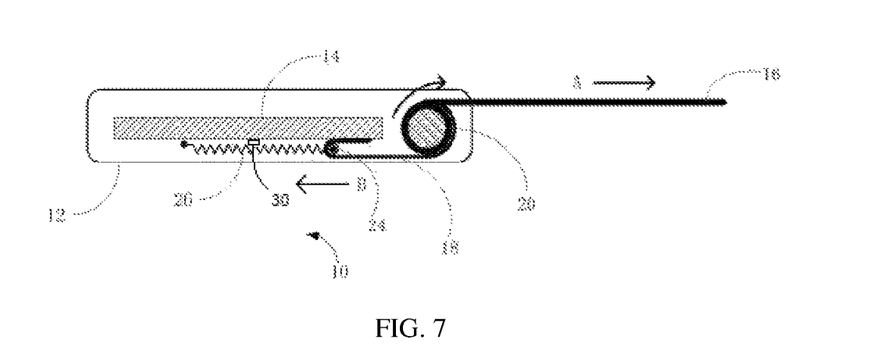
FIG. 7 is a plan schematic view illustrating a detection device being arranged on an elastic element of the flexible display device in accordance with an embodiment of the present disclosure.
Figure 8:
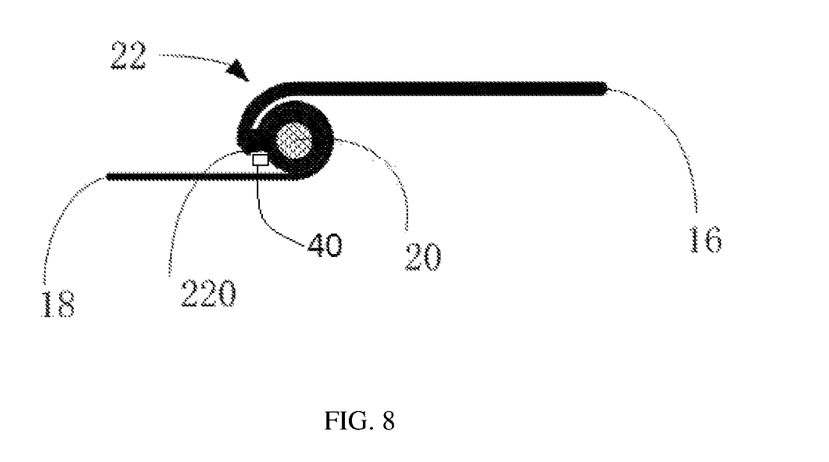
FIG. 8 is a structural schematic view illustrating a detection device being arranged on a first reel of the flexible display device in accordance with another embodiment of the present disclosure.

In an embodiment, a detection device 30 is arranged on the elastic element 26 to detect the deformation of the elastic element 26, so as to determine the extending length of the flexible display 16. Alternatively, a detection device 40 is arranged on the first reel 20 to detect the rotation of the first reel 20, so as to determine the extending length of the flexible display 16. The detection device 30 or 40 can also generate a deformation signal, and the deformation signal is used to control the display of the flexible display 16, changes human-computer interaction content, and the like.

Therefore, by means of that the detection device detects the deformation of the elastic element 26 or the rotation of the first reel 20, the extending length of the flexible display 16 can be determined.

Figure 4:
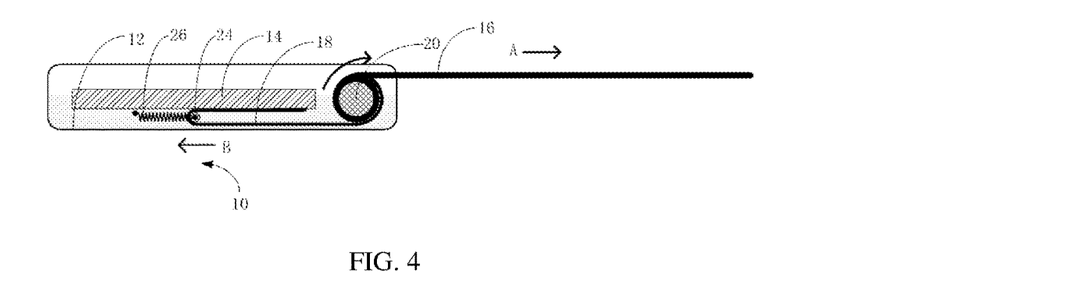
FIG. 4 is a plan schematic view showing a flexible display device in an unfolded state in accordance with an embodiment of the present disclosure.
Figure 5:
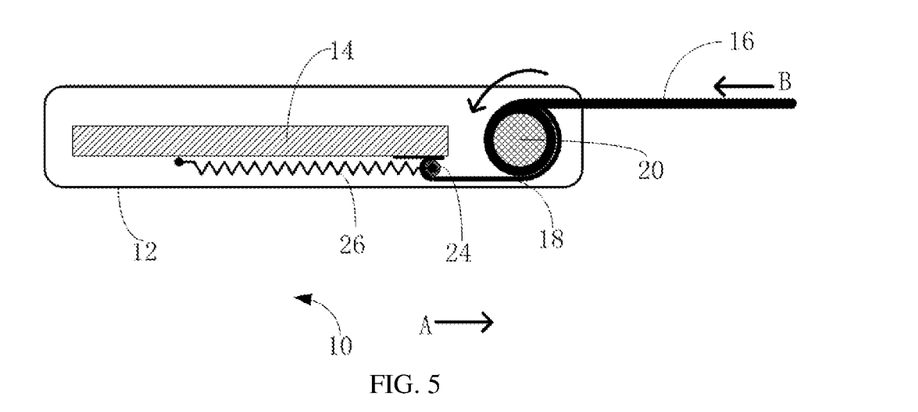
FIG. 5 is a plan schematic view showing a flexible display device in a folded state in accordance with an embodiment of the present disclosure.

Referring to FIGS. 4-5, in the embodiment, when the flexible display 16 is caused to be in the unfolded state, the flexible display is extended out in the first direction A away from the casing 12, the second reel 24 moves in the second direction B opposite to the first direction A under the pull force of the elastic element 26, and the connecting line 18 bypasses the second reel 24 and stays in the tight state. When the flexible display 16 is caused to be in the folded state, the flexible display 16 is driven to move in the second B under the winding of the first reel 20, and meanwhile, the connecting line 18 is wound around the first reel 20.

Therefore, the elastic element 26 makes the connecting line 18 always staying in the tight state. The connecting line 18 has good connectivity during the process that the flexible display 16 is extended out or is folded, thus the reliability of the flexible display device 10 is improved.

In the embodiment, at least a part of the flexible display 16 is arranged outside the casing 12, that is, a part of the flexible display 16 is still arranged outside the casing 12 when the flexible display 16 is fully folded in the casing 12.

Therefore, next time the flexible display 16 is easy to be unfolded outside the casing 12.

Figure 6:
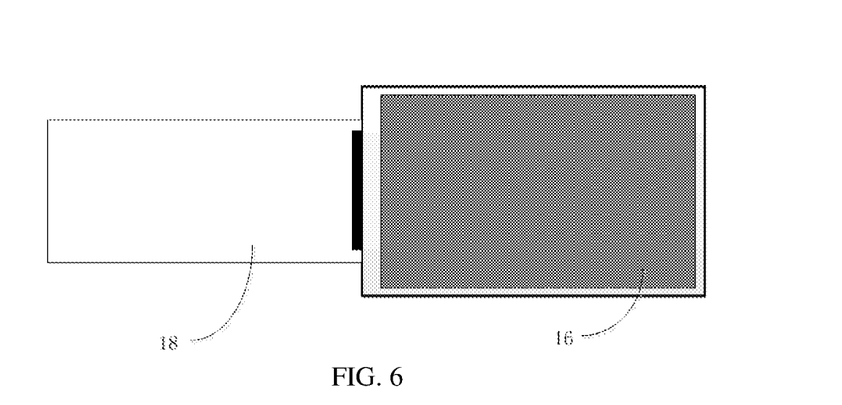
FIG. 6 is a structural schematic view of a flexible display and a connecting line of a flexible display device in accordance with an embodiment of the present disclosure.

Referring to FIG. 6, specifically, the casing 12, the circuit board 14, the flexible display 16, and the connecting line 18 are rectangular. The circuit board 14, the connecting line 18, the first reel 20, the second reel 24, and the elastic element 26 are received in the casing 12. The junction 220 formed when the connecting line 18 and the flexible display 16 are folded is secured to the first reel 20. The connecting line 18 and the flexible display 16 are extended with 180 degrees defined therebetween, that is, the connecting line 18 and the flexible display 16 are extended in opposite directions. The first reel 20 is adjacent to a sidewall of the casing 12 to reduce the distance between the flexible display 16 and the sidewall, and the second reel 24 is far away from the sidewall than the first reel 20. An end of the elastic element 26 is secured to the casing 12, and another end of the elastic element 26 is connected to the second reel 24. The second reel 24 can be driven by the elastic element 26 to roll horizontally. When the flexible display 16 is fully unfolded, a part of the flexible display 16 and a part of the connecting line 18 are still wound around the first reel 20. The first reel 20 is fixed in the casing 12. A driver is arranged in the first reel 20 to rotate the first reel 20. When the flexible display 16 is unfolded, the first reel 20 rotates clockwise. When the flexible display 16 is folded, the first reel 20 rotates counterclockwise.

However, the above shapes and connection relationships are just given as examples to help to explain the specific structure of the flexible display device 10, and are not to limit the present disclosure.

In the description of the specification, reference term "an embodiment," "some embodiments," "an example," "a specific example," or "some examples," means that a particular feature, structure, material, or characteristic described in connection with the embodiment or example is included in at least one embodiment or example of the present disclosure. In the specification, explanatory representations of the above terms are not necessarily referring to the same embodiment or example. Furthermore, the particular features, structures, materials, or characteristics may be combined in any suitable manner in one or more embodiments or examples.

Although the forgoing has shown and described the embodiments of the present disclosure. It can be understood that the above embodiments are examples, and cannot be construed to limit the present disclosure. Those skilled in the art can make changes, modifications, replacements, and deformations within the scope of the present disclosure without departing from the principles and purposes of the present disclosure. The scope of the present disclosure is limited by the appending claims and their equivalence.

What is claimed is:

1. A flexible display device, comprising:
   a casing;
   a circuit board received in the casing;
   a flexible display at least partially received in the casing;
   a connecting line connecting the circuit board and the flexible display;
   a first reel rotatably arranged in the casing and operable to wind the flexible display and the connecting line;
   a junction portion protruding from and fixed on the first reel, wherein the connecting line and the flexible display are connected together via the junction portion;
   a second reel in the casing and operable to wind the connecting line and;
   an elastic element in the casing, wherein an end of the elastic element is connected to the second reel, and another end of the elastic element is fixed to the casing;
   wherein, when the flexible display is fully unfolded outside the casing, the connecting line is at least partially wound around the first reel from the junction portion;
   when the flexible display is folded in the casing, both the flexible display and the connecting line are wound around the first reel.

2. The flexible display device of claim 1, wherein the elastic element is a spring.

3. The flexible display device of claim 1, wherein the connecting line is a flexible printed circuit (FPC).

4. The flexible display device of claim 1, wherein the length of the connecting line wound around the first reel is larger than $\pi r$, where r is the radius of the first reel.

5. The flexible display device of claim 1, wherein a detection device is arranged on the elastic element, and the detection device is operable to detect the deformation of the elastic element; or
   a detection device is arranged on the first reel, and the detection device is operable to detect the rotation of the first reel;
   the extending length of the flexible display is determined based on the deformation or the rotation.

6. The flexible display device of claim 1, wherein when the flexible display is in an unfolded state, the flexible display is extended out in a first direction away from the casing, the second reel moves in a second direction opposite to the first direction under the pull force of the elastic element, and the connecting line bypasses the second reel and stays in the tight state;
   when the flexible display is in a folded state, the flexible display moves in the second direction under the winding of the first reel, and the connecting line is wound around the first reel.

7. The flexible display device of claim 1, wherein at least a part of the flexible display is arranged outside the casing.

8. A flexible display device, comprising:
   a casing;
   a circuit board received in the casing;
   a flexible display at least partially received in the casing;
   a connecting line connecting the circuit board and the flexible display;
   a first reel rotatably arranged in the casing and operable to wind the flexible display and the connecting line, wherein the flexible display and the connecting line are connected together via a junction portion fixed on the first reel;
   a second reel arranged in the casing and operable to wind the connecting line; and
   an elastic element arranged in the casing and operable to provide an elastic force to the second reel.

9. The flexible display device of claim 8, wherein the elastic element is a spring.

10. The flexible display device of claim 8, wherein the connecting line is a flexible printed circuit (FPC).

11. The flexible display device of claim 8, wherein the length of the connecting line wound around the first reel is larger than $\pi r$, where r is the radius of the first reel.

12. The flexible display device of claim 8, wherein a detection device is arranged on the elastic element, and the detection device is operable to detect the deformation of the elastic element; or
   a detection device is arranged on the first reel, and the detection device is operable to detect the rotation of the first reel;
   the extending length of the flexible display is determined based on the deformation or the rotation.

13. The flexible display device of claim 12, wherein the detection device is operable to generate a deformation signal based on the deformation or the rotation, and the deformation signal is operable to control the display of the flexible display.

14. The flexible display device of claim 8, wherein when the flexible display is in an unfolded state, the flexible display is extended out in a first direction away from the casing, the second reel moves in a second direction opposite to the first direction under the pull force of the elastic element, and the connecting line bypasses the second reel and stays in a tight state;

when the flexible display is in a folded state, the flexible display moves in the second direction under the winding of the first reel, and the connecting line is wound around the first reel.

15. The flexible display device of claim 8, wherein at least a part of the flexible display is arranged outside the casing.

16. The flexible display device of claim 8, wherein the junction portion is arc.

17. The flexible display device of claim 8, wherein when the flexible display and the connecting line are folded, the flexible display and the connecting line partially overlap each other to form an overlapping segment.

18. The flexible display device of claim 8, wherein a radian of the overlapping segment is greater than or equal to $\pi/2$ rad.

* * * * *